(12) United States Patent
Horii et al.

(10) Patent No.: US 12,523,417 B2
(45) Date of Patent: Jan. 13, 2026

(54) FOOD MANAGEMENT SYSTEM, AND REFRIGERATOR

(71) Applicant: Panasonic Intellectual Property Management Co., Ltd., Osaka (JP)

(72) Inventors: Shinichi Horii, Shiga (JP); Zarina Rafii, Nara (JP); Gantetsu Matsui, Kyoto (JP); Taku Kariyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 308 days.

(21) Appl. No.: 18/042,136

(22) PCT Filed: Jul. 26, 2021

(86) PCT No.: PCT/JP2021/027566
§ 371 (c)(1),
(2) Date: Feb. 17, 2023

(87) PCT Pub. No.: WO2022/049920
PCT Pub. Date: Mar. 10, 2022

(65) Prior Publication Data
US 2023/0324113 A1    Oct. 12, 2023

(30) Foreign Application Priority Data

Sep. 3, 2020    (JP) .................................. 2020-148479

(51) Int. Cl.
F25D 29/00    (2006.01)
(52) U.S. Cl.
CPC .......... *F25D 29/00* (2013.01); *F25D 2600/06* (2013.01)
(58) Field of Classification Search
CPC ............................ F25D 29/00; F25D 2600/06
See application file for complete search history.

(56) References Cited

U.S. PATENT DOCUMENTS

2014/0300265 A1* 10/2014 Lee .................. F25D 23/028
312/405.1
2014/0313328 A1* 10/2014 Park .................. F25D 29/00
348/143
(Continued)

FOREIGN PATENT DOCUMENTS

JP    2003042626 A    2/2003
JP    2015-125535 A    7/2015
(Continued)

OTHER PUBLICATIONS

International Search Report, International Patent Application No. PCT/JP2021/027566, Aug. 31, 2021, with English translation (4 pages).
(Continued)

*Primary Examiner* — Larry L Furdge
(74) *Attorney, Agent, or Firm* — HSML P.C.

(57) ABSTRACT

The present disclosure provides a food management system 1000 that can accurately detect a food item contained in a refrigerator 1.
The food management system 1000 configured to manage a food item contained in the refrigerator 1 includes a refrigerator compartment camera 21 provided at an upper part of the refrigerator 1 and configured to capture an image of an image capturing range including an opening of a refrigerator compartment 11 of the refrigerator 1; a drawer camera 22 provided at the upper part of the refrigerator 1 and configured to capture an image of an image capturing range including a drawer pulled out of a housing compartment other than the refrigerator compartment 11; and a food detection unit configured to detect a food item taken into or out of the refrigerator 1 based on an image capturing result of at least one of the refrigerator compartment camera 21 and the drawer camera 22.

6 Claims, 10 Drawing Sheets

(56) References Cited

U.S. PATENT DOCUMENTS

2014/0313331 A1* 10/2014 Kim ..................... F25D 29/00
348/143
2016/0021342 A1* 1/2016 Aso ..................... H04N 7/183
702/150
2021/0089769 A1* 3/2021 Ryu ..................... G06V 20/00

FOREIGN PATENT DOCUMENTS

| JP | 2016-057022 A | 4/2016 |
| JP | 2016-080232 A | 5/2016 |
| JP | 5918210 B2 | 5/2016 |
| JP | 2017-089913 A | 5/2017 |
| JP | 2018-146177 A | 9/2018 |
| JP | 2019-070467 A | 5/2019 |
| JP | 2019-070477 A | 5/2019 |

OTHER PUBLICATIONS

Extended European Search Report issued in European Patent Application No. 21863978.9, Jan. 17, 2024 (8 pages).
Office Action issued in European Patent Application No. 21 863 978.9, Oct. 1, 2025 (6 pages).

* cited by examiner

| USER ID 4231 | REFRIGERATOR ID 123 | FOOD NAME INFORMATION 4232 | REMAINING NUMBER INFORMATION 4233 | STORAGE PLACE INFORMATION 4234 | STORAGE START DATE INFORMATION 4235 |
|---|---|---|---|---|---|
| US0303 | RF1101 | PACKET OF MILK | ONE | REFRIGERATOR COMPARTMENT | 2021/3/3 |
| | | CAN OF BEER | THREE | REFRIGERATOR COMPARTMENT | 2021/3/19 |
| | | EGG | FOUR | REFRIGERATOR COMPARTMENT | 2021/3/14 |
| | | ONION | SIX | VEGETABLE COMPARTMENT | 2021/3/14 |

| DEADLINE DATE INFORMATION 4236 | DEADLINE DATE NOTIFICATION TIMING INFORMATION 4237 | NEW-NOTIFICATION TIMING INFORMATION 4238 | FOOD IMAGE DATA 4239 |
|---|---|---|---|
| 2021/3/10 | THREE DAYS BEFORE | ONE DAY | XXX.jpg |
| 2022/3/19 | SEVEN DAYS BEFORE | ONE DAY | YYY.jpg |
| 2021/4/14 | THREE DAYS BEFORE | ONE DAY | ZZZ.jpg |
| 2021/4/14 | SIX DAYS BEFORE | TWO DAYS | XYZ.jpg |

R

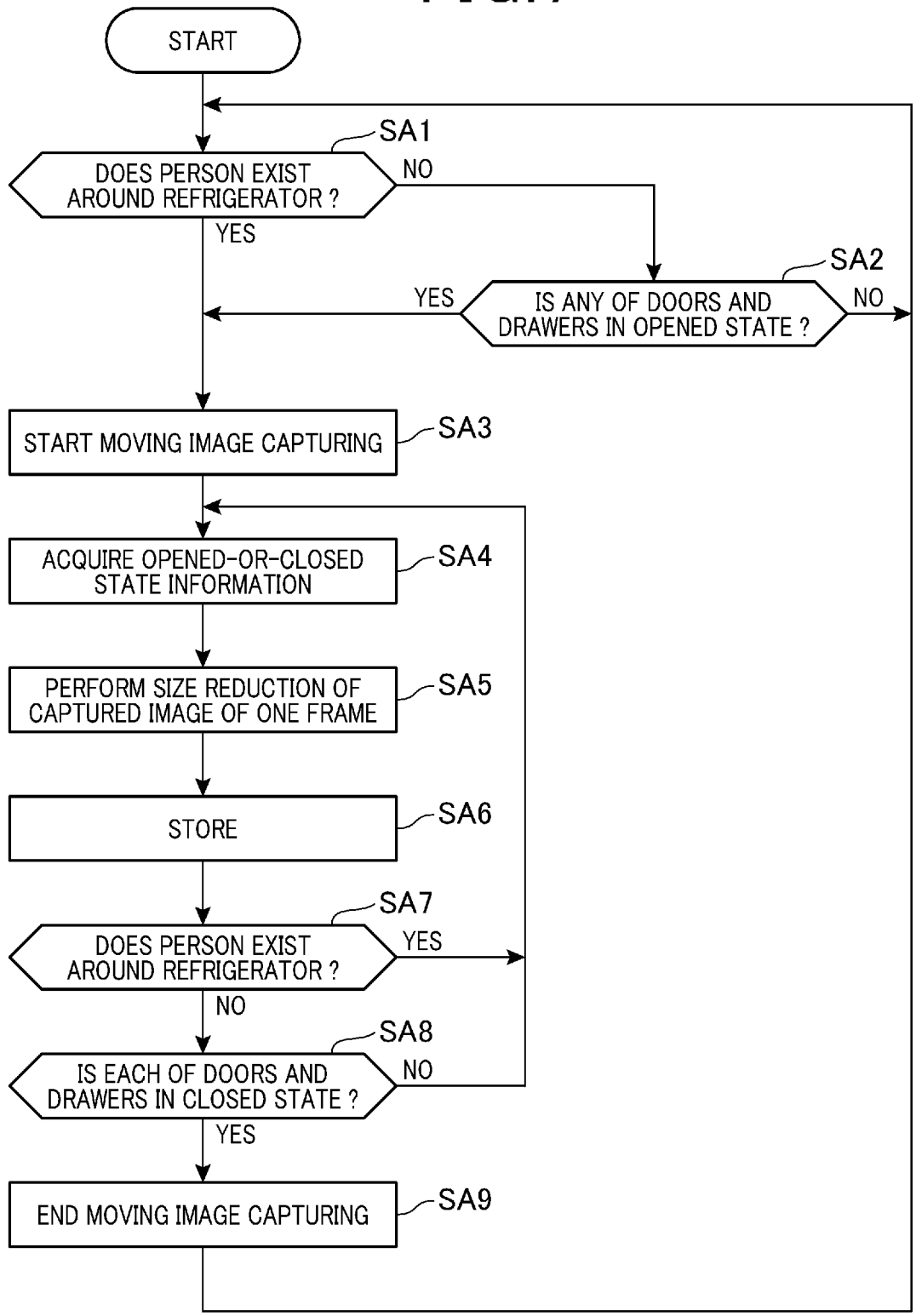

FOOD MANAGEMENT SYSTEM, AND REFRIGERATOR

TECHNICAL FIELD

The present disclosure relates to a food management system and a refrigerator.

BACKGROUND ART

Patent Literature 1 discloses a stock management system configured to detect a food item taken into or out of a refrigerator compartment with a camera provided at an upper part of the refrigerator compartment.

CITATION LIST

Patent Literature

[Patent Literature 1]
Japanese Patent Laid-Open No. 2018-146177

SUMMARY OF INVENTION

Technical Problem

The present disclosure provides a food management system and a refrigerator that are capable of accurately detecting a food item contained in the refrigerator.

Solution to Problem

A food management system in the present disclosure is a food management system configured to manage a food item contained in a refrigerator and includes a first camera provided at an upper part of the refrigerator and configured to capture an image of an image capturing range including an opening of a refrigerator compartment of the refrigerator, a second camera provided at the upper part of the refrigerator and configured to capture an image of an image capturing range including a drawer pulled out of a housing compartment other than the refrigerator compartment, and a food detection unit configured to detect a food item taken into or out of the refrigerator based on an image capturing result of at least one of the first camera and the second camera.

A refrigerator in the present disclosure is a refrigerator in which a food item can be contained, and includes a first camera provided at an upper part of the refrigerator and configured to capture an image of an image capturing range including an opening of a refrigerator compartment of the refrigerator, a second camera provided at the upper part of the refrigerator and configured to capture an image of an image capturing range including a drawer pulled out of a housing compartment other than the refrigerator compartment, and a food detection unit configured to detect a food item taken into or out of the refrigerator based on an image capturing result of at least one of the first camera and the second camera.

Note that the present specification includes the entire content of Japanese Patent Application No. 2020-148479, filed on Sep. 3, 2020.

Advantageous Effects of Invention

A food management system and a refrigerator in the present disclosure can detect a food item taken into or out of a housing compartment in which a food item is contained in a drawer in addition to a food item taken into or out of a refrigerator compartment based on an image capturing result, and thus can accurately detect a food item taken into or out of the refrigerator.

BRIEF DESCRIPTION OF DRAWINGS

FIG. 6 is a diagram illustrating an example of a food management database.

FIG. 7 is a flowchart illustrating operation of the refrigerator.

DESCRIPTION OF EMBODIMENTS

Knowledge and the Like on which the Present Disclosure is Based

Typically, in a refrigerator, food items are contained not only in a refrigerator compartment but also in a housing compartment including a drawer, such as a vegetable compartment or a freezer compartment. Thus, in order to accurately detect a food item contained in the refrigerator, it is desirable to detect a food item taken in or out with consideration on the housing compartment including a drawer in addition to the refrigerator compartment.

Thus, the present disclosure provides a food management system and a refrigerator that are capable of accurately detecting a food item contained in the refrigerator.

Embodiments will be described below in detail with reference to the drawings. However, unnecessarily detailed description is omitted in some cases. For example, detailed description of an already well-known matter or duplicate description of components that are substantially identical to each other is omitted in some cases.

Note that the accompanying drawings and the following description are provided to facilitate sufficient understanding of the present disclosure by the skilled person in the art and are not intended to limit the subject matter described in the claims.

1. Configuration

Figure 1:
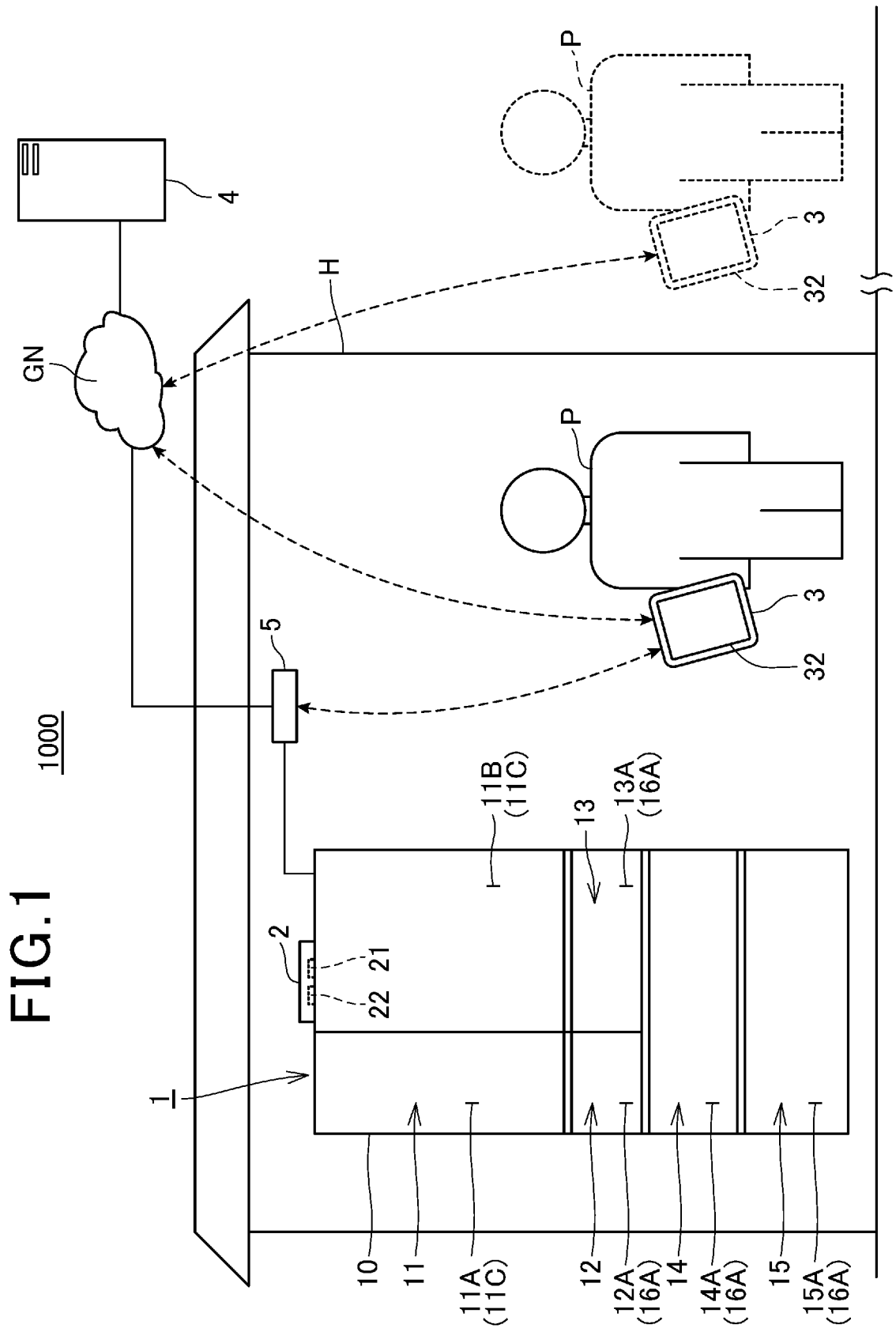
FIG. 1 is a diagram illustrating a configuration of a food management system.

FIG. 1 is a diagram illustrating a configuration of a food management system 1000.

The food management system 1000 is a system configured to manage the remaining numbers of food items contained in a refrigerator 1, storage start dates on which their storage is started, their deadline dates such as best-before dates or use-by dates, and the like.

The food management system 1000 includes the refrigerator 1. The refrigerator 1 establishes communication connection with a communication device 5 installed at a home H of a user P and communicates with a food management server 4 through the communication device 5.

The refrigerator 1 includes a main box 10 having a front opening. A refrigerator compartment 11, an ice compartment 12, a fresh freezing compartment 13, a freezer compartment 14, and a vegetable compartment 15 are formed in the main box 10. A turn-style left door 11A and a turn-style right door 11B are provided at a front opening of the refrigerator compartment 11. Drawers 12A, 13A, 14A, and 15A in which food items are contained are provided at the ice compartment 12, the fresh freezing compartment 13, the freezer compartment 14, and the vegetable compartment 15, respectively.

In description below, the left door 11A and the right door 11B are collectively referred to as "doors" denoted by a reference sign "11C" when not distinguished from each other. In addition, in description below, the drawers 12A, 13A, 14A, and 15A are collectively referred to as "drawers" denoted by a reference sign "16A" when not distinguished from each other.

The refrigerator 1 includes a camera module 2.

A configuration of the camera module 2 included in the refrigerator 1 will be described below with reference to FIGS. 2 and 3.

Figure 2:
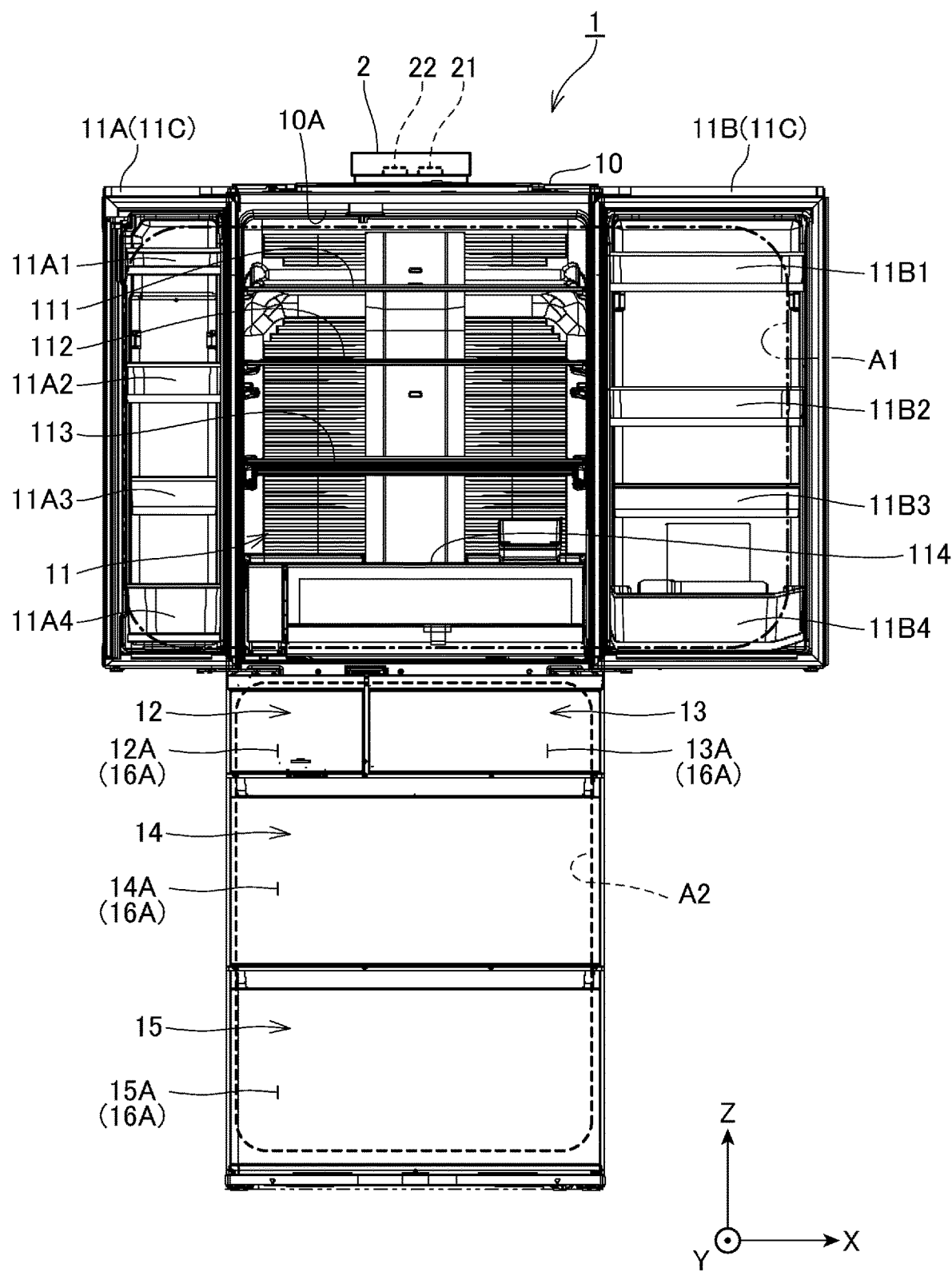
FIG. 2 is a diagram of a refrigerator when viewed from a front side.

FIG. 2 is a diagram of the refrigerator 1 when viewed from a front side. The left door 11A and the right door 11B of the refrigerator 1 illustrated in FIG. 2 are in an opened state. FIG. 3 is a diagram of the refrigerator 1 when viewed from a right side. The drawer 15A of the refrigerator 1 illustrated in FIG. 3 is in an opened state. Note that the opened state of each drawer 16A is a state in which the drawer 16A is pulled out of a corresponding housing compartment, and the closed state thereof is a state in which the drawer 16A is contained in the corresponding housing compartment.

Figure 3:
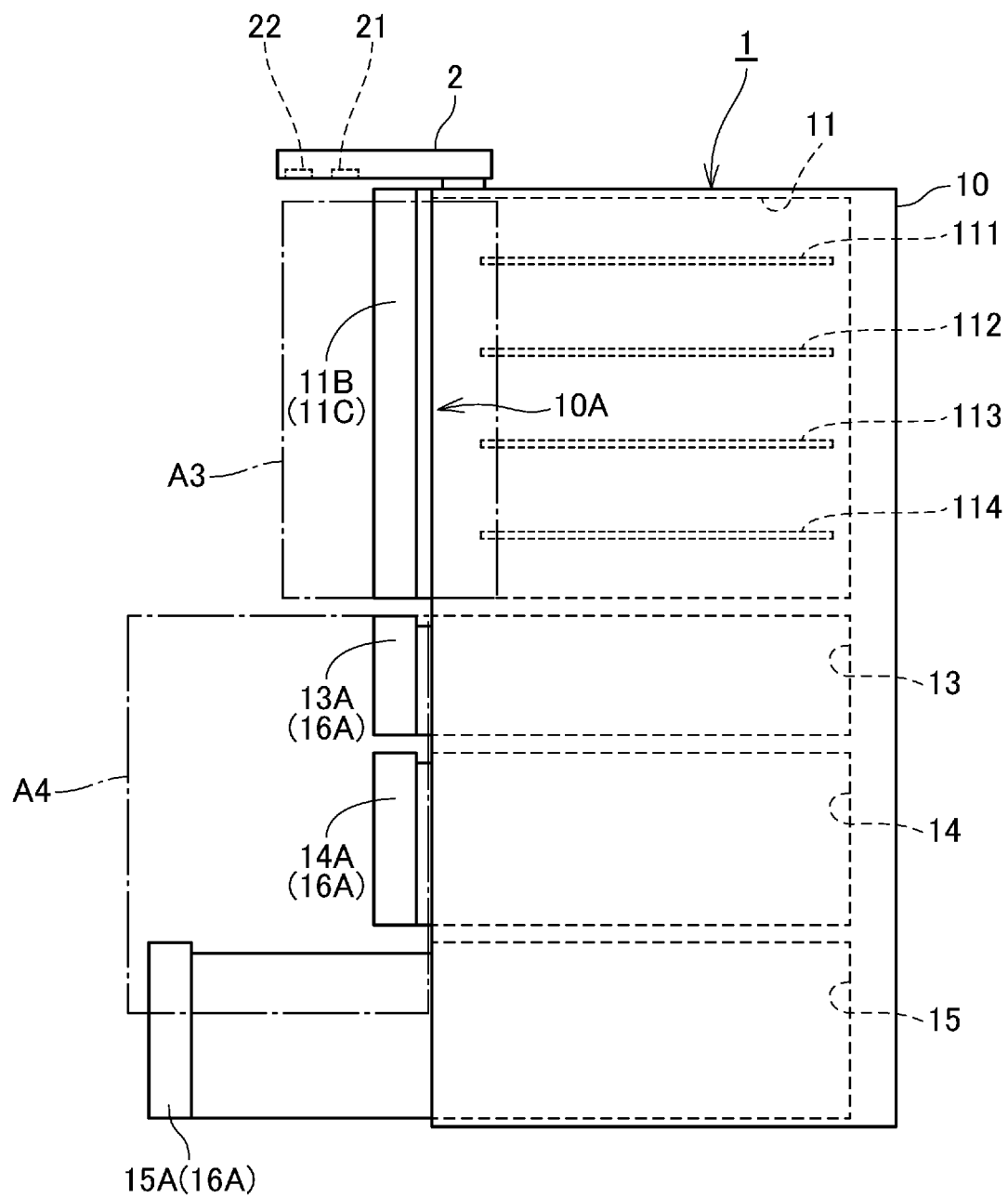
FIG. 3 is a diagram of the refrigerator when viewed from a right side.

An X axis, a Y axis, and a Z axis are illustrated in FIGS. 2 and 3. The X axis, the Y axis, and the Z axis are orthogonal to one another. The Z axis represents an up-down direction. The X axis and the Y axis are parallel to a horizontal direction. The X axis represents a right-left direction. The Y axis represents a front-back direction. A positive direction of the X axis represents a right direction. A positive direction of the Y axis represents a front direction. A positive direction of the Z axis represents an up direction.

The camera module 2 includes a refrigerator compartment camera 21 and a drawer camera 22. The camera module 2 is provided on an upper surface of the main box 10 as an upper part of the refrigerator 1.

Note that the refrigerator compartment camera 21 corresponds to an example of a "first camera". The drawer camera 22 corresponds to an example of a "second camera".

The refrigerator compartment camera 21 is a camera for detecting a food item taken into or out of the refrigerator compartment 11.

An image capturing range of the refrigerator compartment camera 21 is a range with which an image of a food item taken into or out of the refrigerator compartment 11 can be captured from an upper front of the refrigerator compartment 11, and includes an opening 10A of the refrigerator compartment 11.

For example, the image capturing range of the refrigerator compartment camera 21 has a range A1 illustrated in FIG. 2 in a front view. The range A1 is a range including door pockets 11A1, 11A2, 11A3, and 11A4 provided at the left door 11A, door pockets 11B1, 11B2, 11B3, and 11B4 provided at the right door 11B, and the opening 10A of the refrigerator compartment 11 when the left door 11A and the right door 11B are in the opened state. The image capturing range of the refrigerator compartment camera 21 also has a range A3 illustrated in FIG. 3 in a side view. The range A3 is a range including doors 11C in the opened state to front end parts of shelves 111, 112, 113, and 114 in the front-back direction and including the opening 10A of the refrigerator compartment 11 in the up-down direction. Note that the shelves 111, 112, 113, and 114 are members provided in the refrigerator compartment 11 and partitioning the refrigerator compartment 11 into a plurality of regions.

The drawer camera 22 is a camera for detecting food items taken into and out of the ice compartment 12, the fresh freezing compartment 13, the freezer compartment 14, and the vegetable compartment 15.

An image capturing range of the drawer camera 22 is a range with which an image of a food item taken into or out of each of the ice compartment 12, the fresh freezing compartment 13, the freezer compartment 14, and the vegetable compartment 15 can be captured at the upper front of the refrigerator compartment 11, and includes the drawers 16A in a state of being pulled out.

For example, the image capturing range of the drawer camera 22 has a range A2 illustrated in FIG. 2 in a front view. The range A2 is a range including the drawers 12A, 13A, 14A, and 15A in a front view of the refrigerator 1. The image capturing range of the drawer camera 22 has a range A4 illustrated in FIG. 3 in a side view. The range A4 is a range including the drawers 12A, 13A, 14A, and 15A in states of being pulled out in the front-back direction.

Note that FIG. 2 illustrates that the drawer camera 22 and the refrigerator compartment camera 21 are arranged in this order in the right-left direction at the upper part of the refrigerator 1. However, this is an illustration for convenience of description of the cameras included in the camera module 2 and the cameras may be not provided as illustrated in FIG. 2.

In addition, FIG. 3 illustrates that the drawer camera 22 and the refrigerator compartment camera 21 are arranged in this order in the front-back direction at the upper part of the refrigerator 1. However, this is an illustration for convenience of description of the cameras included in the camera module 2 and the cameras may be not provided as illustrated in FIG. 3.

Back in description of FIG. 1, the food management system 1000 includes a terminal device 3 including a touch panel 32. The terminal device 3 is configured as, for example, a smartphone or a tablet terminal. An application program for managing food items contained in the refrigerator 1 is installed on the terminal device 3, and the terminal device 3 communicates with a food management server 4 by using functions of the application.

In description below, the application program for managing food items contained in the refrigerator 1 is referred to as a "food management app" denoted by a reference sign "323".

In FIG. 1, a user P at home is illustrated with solid lines, and the user P out of a home H is illustrated with dotted lines. When used by the user P at home, the terminal device 3 communicates, through a communication device 5 or not through the communication device 5 by using the functions of a food management app 323, with the food management server 4 connected to a global network GN. When used by the user P out of the home H, the terminal device 3 communicates the food management server 4 not through the communication device 5 by using the functions of the food management app 323.

The communication device 5 is connected to the global network GN including the Internet, a phone network, and any other communication network and communicates with the food management server 4 connected to the global network GN. The communication device 5 is an interface device for connecting the terminal device 3 to the global network GN. The communication device 5 has functions such as a modem function, a router function, and a network address translation (NAT) function. The communication device 5 forwards data transmitted and received between the terminal device 3 and the food management server 4 connected to the global network GN.

The food management system 1000 includes the food management server 4. The food management server 4 is a server device configured to manage food items contained in the refrigerator 1 and connected to the global network GN. Note that, although the food management server 4 is represented by one block in each drawing, this does not necessarily mean that the food management server 4 is configured as a single server device. For example, the food management server 4 may include a plurality of server devices having different processing contents.

Configurations of the refrigerator 1, the terminal device 3, and the food management server 4 will be described next.

Figure 4:
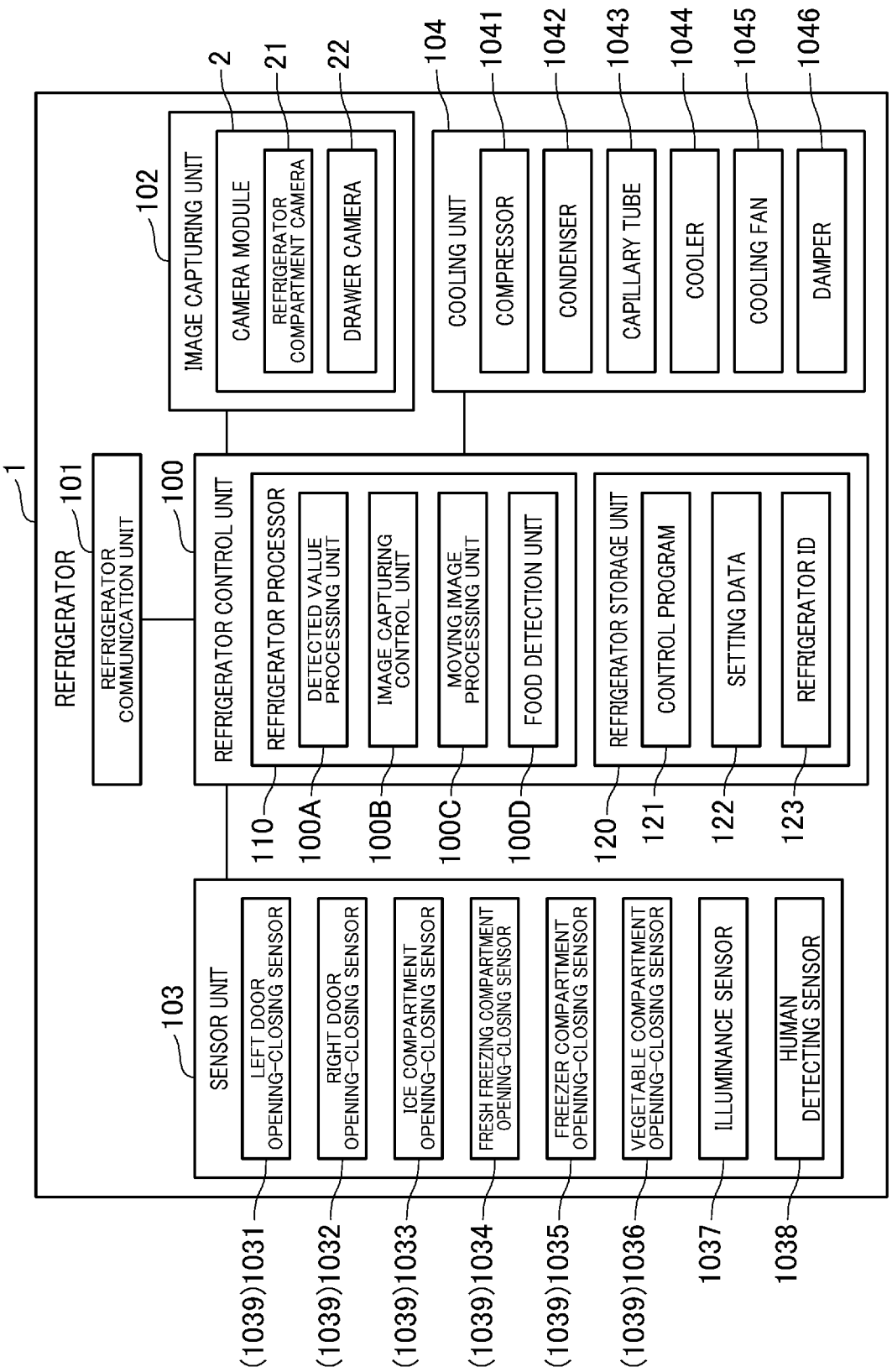
FIG. 4 is a block diagram illustrating a configuration of the refrigerator.

FIG. 4 is a block diagram illustrating a configuration of the refrigerator 1.

The refrigerator 1 includes a refrigerator control unit 100, a refrigerator communication unit 101, an image capturing unit 102, a sensor unit 103, and a cooling unit 104.

The refrigerator control unit 100 includes a refrigerator processor 110 that is a processor such as a CPU or an MPU configured to execute a computer program, and a refrigerator storage unit 120, and controls each component of the refrigerator 1. The refrigerator control unit 100 executes various kinds of processing through hardware and software cooperation so that the refrigerator processor 110 reads a control program 121 stored in the refrigerator storage unit 120 and executes processing. The refrigerator control unit 100 functions as a detected value processing unit 100A, an image capturing control unit 100B, a moving image processing unit 100C, and a food detection unit 100D by reading and executing the control program 121.

The refrigerator storage unit 120 has a storage region in which a computer program executed by the refrigerator processor 110 and data processed by the refrigerator processor 110 are stored. The refrigerator storage unit 120 stores the control program 121 executed by the refrigerator processor 110, setting data 122 related to setting of the refrigerator 1, a refrigerator ID 123, and other various kinds of data. The refrigerator ID 123 will be described later. The refrigerator storage unit 120 has a non-volatile storage region. The refrigerator storage unit 120 may have a volatile storage region and provide a work area of the refrigerator processor 110.

The refrigerator communication unit 101 includes a communication hardware compatible with a predetermined communication standard and communicates with equipment connected to the global network GN in accordance with the predetermined communication standard under control of the refrigerator control unit 100. In the present embodiment, the refrigerator communication unit 101 communicates with the food management server 4 in accordance with the predetermined communication standard. The communication standard used by the refrigerator communication unit 101 may be a wireless communication standard (for example, IEEE 802.11a/11b/11g/11n/11ac or Bluetooth®) or may be a wired communication standard.

The image capturing unit 102 includes the camera module 2. The image capturing unit 102 outputs an image capturing result of each of the refrigerator compartment camera 21 and the drawer camera 22 to the refrigerator control unit 100. In the present embodiment, the refrigerator compartment camera 21 and the drawer camera 22 capture a moving image. Thus, the image capturing unit 102 outputs moving image data as an image capturing result to the refrigerator control unit 100.

The sensor unit 103 includes various sensors and outputs a detected value of each sensor to the refrigerator control unit 100. The sensor unit 103 includes a left door opening-closing sensor 1031, a right door opening-closing sensor 1032, an ice compartment opening-closing sensor 1033, a fresh freezing compartment opening-closing sensor 1034, a freezer compartment opening-closing sensor 1035, a vegetable compartment opening-closing sensor 1036, an illuminance sensor 1037, and a human detecting sensor 1038.

In description below, the left door opening-closing sensor 1031, the right door opening-closing sensor 1032, the ice compartment opening-closing sensor 1033, the fresh freezing compartment opening-closing sensor 1034, the freezer compartment opening-closing sensor 1035, and the vegetable compartment opening-closing sensor 1036 are referred to as "opening-closing sensors" denoted by a reference sign "1039" when collectively referred without distinction. Note that an optional scheme such as a distance measurement scheme or a contact scheme is employed as a detection scheme of an opening-closing sensors 1039.

The left door opening-closing sensor 1031 is provided at a predetermined position of the refrigerator compartment 11 and detects an opened or closed state of the left door 11A.

The right door opening-closing sensor 1032 is provided at a predetermined position of the refrigerator compartment 11 and detects an opened or closed state of the right door 11B.

The ice compartment opening-closing sensor 1033 is provided at a predetermined position of the ice compartment 12 and detects an opened or closed state of the drawer 12A.

The fresh freezing compartment opening-closing sensor 1034 is provided at a predetermined position of the fresh freezing compartment 13 and detects an opened or closed state of the drawer 13A.

The freezer compartment opening-closing sensor 1035 is provided at a predetermined position of the freezer compartment 14 and detects an opened or closed state of the drawer 14A.

The vegetable compartment opening-closing sensor 1036 is provided at a predetermined position of the vegetable compartment 15 and detects an opened or closed state of the drawer 15A.

The illuminance sensor 1037 detects illuminance at a place where the refrigerator 1 is disposed. The illuminance sensor 1037 is provided on, for example, a front surface or side surface of the camera module 2, or a front surface of the refrigerator 1.

The human detecting sensor 1038 detects a person existing around the refrigerator 1. In the present embodiment, the human detecting sensor 1038 is provided on, for example, the front surface of the refrigerator 1 and detects a person existing on the front side of the refrigerator 1 around the refrigerator 1.

The cooling unit 104 includes a mechanism configured to cool each housing compartment of the refrigerator 1, the mechanism including a compressor 1041, a condenser 1042, a capillary tube 1043, a cooler 1044, a cooling fan 1045 configured to transfer cool air generated by the cooler 1044 to each housing compartment, and a damper 1046 configured to divide flow of the cool air transferred by the cooling fan 1045. The cooling unit 104 cools each housing compartment of the refrigerator 1 in accordance with control of the refrigerator control unit 100.

As described above, the refrigerator control unit 100 functions as the detected value processing unit 100A, the image capturing control unit 100B, the moving image processing unit 100C, and the food detection unit 100D.

The detected value processing unit 100A determines whether the left door 11A, the right door 11B, and the drawers 12A, 13A, 14A, and 15A are each in the opened state or the closed state based on detected values of the opening-closing sensors 1039, which are output from the sensor unit 103. For example, the detected value processing unit 100A determines the opened state or the closed state based on whether or not a detected value is smaller than a predetermined threshold value. Note that the predetermined threshold value may be different among the left door 11A, the right door 11B, and the drawers 12A, 13A, 14A, and 15A. When having determined that any of them is in the opened state, the detected value processing unit 100A outputs opened-or-closed state information indicating the opened state to the image capturing control unit 100B and the moving image processing unit 00C. When having determined that the left door 11A, the right door 11B, and the drawers 12A, 13A, 14A, and 15A are each in the closed state, the detected value processing unit 100A outputs opened-or-closed state information indicating the closed state to the image capturing control unit 100B and the moving image processing unit 100C.

The detected value processing unit 100A also determines whether or not a person exists around the refrigerator 1 based on detected values of the illuminance sensor 1037 and the human detecting sensor 1038, which are output from the sensor unit 103. For example, the detected value processing unit 100A determines whether or not a person exists around the refrigerator 1 based on whether or not each detected value is smaller than a predetermined threshold value. When having determined that a person exists around the refrigerator 1, the detected value processing unit 100A outputs person existence information indicating that a person exists to the image capturing control unit 100B. When having determined that no person exists around the refrigerator 1, the detected value processing unit 100A outputs person existence information indicating that no person exists to the image capturing control unit 100B.

The image capturing control unit 100B controls the image capturing unit 102 to cause the refrigerator compartment camera 21 and the drawer camera 22 to capture moving images. Details of the image capturing control unit 100B will be described with reference to FIG. 8.

The moving image processing unit 100C performs various kinds of processing on image capturing results of the refrigerator compartment camera 21 and the drawer camera 22 and stores the image capturing results provided with the processing in the refrigerator storage unit 120. Details of the moving image processing unit 100C will be described below with reference to FIG. 7.

The food detection unit 100D detects food items taken into and out of the refrigerator 1 based on the image capturing results of the refrigerator compartment camera 21 and the drawer camera 22. Details of the food detection unit 100D will be described with reference to FIG. 9.

Figure 5:
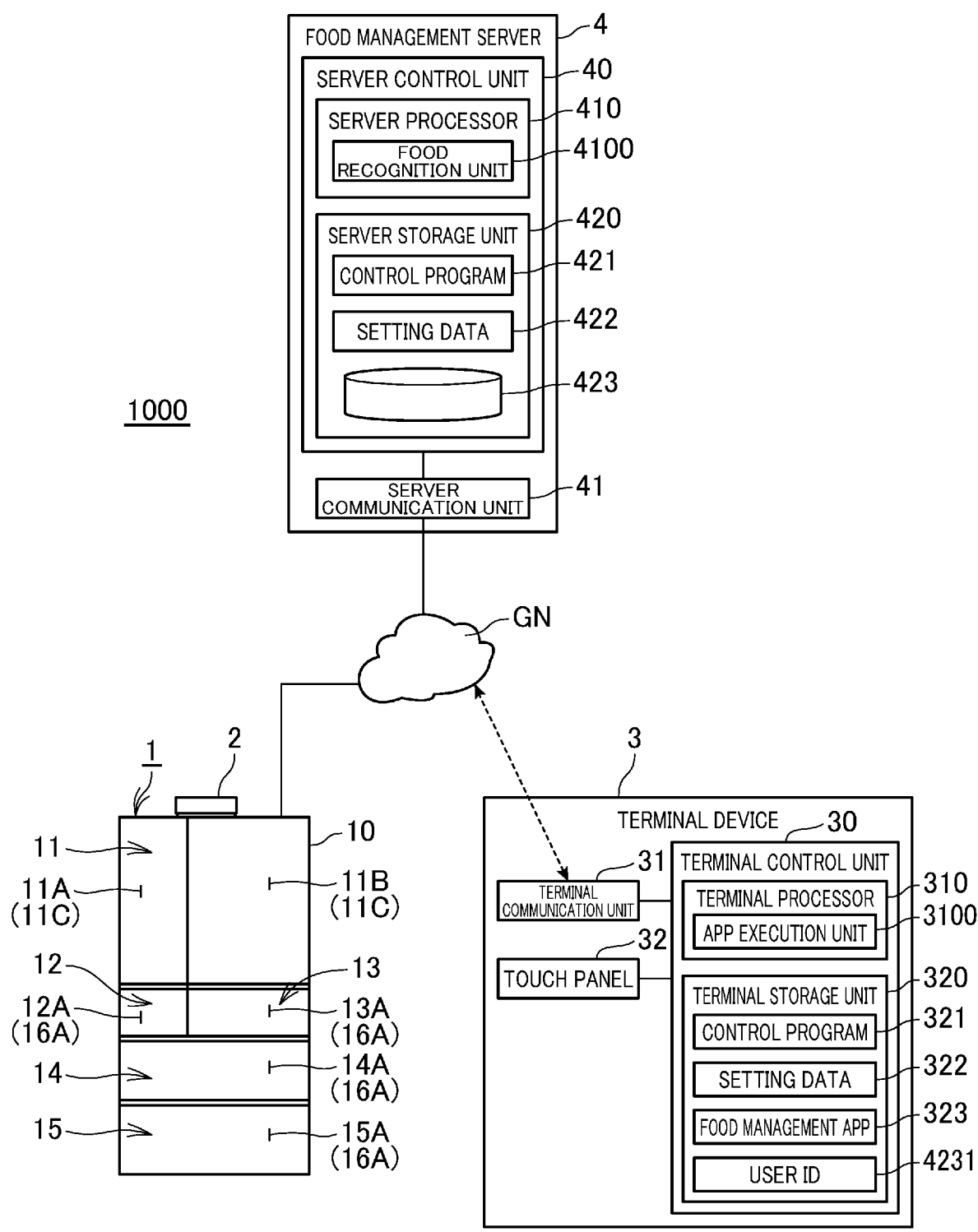
FIG. 5 is a block diagram illustrating configurations of a terminal device and a food management server.

FIG. 5 is a block diagram illustrating configurations of the terminal device 3 and the food management server 4.

The configuration of the food management server 4 will be described first.

The food management server 4 includes a server control unit 40 and a server communication unit 41.

The server control unit 40 includes a server processor 410 that is a processor such as a CPU or an MPU configured to execute a computer program, and a server storage unit 420, and controls each component of the food management server 4. The server control unit 40 executes various kinds of processing through hardware and software cooperation so that the server processor 410 reads a control program 421 stored in the server storage unit 420 and executes processing. The server control unit 40 functions as a food recognition unit 4100 by reading and executing the control program 421.

The server storage unit 420 has a storage region in which a computer program executed by the server processor 410 and data processed by the server processor 410 are stored. The server storage unit 420 stores the control program 421 executed by the server processor 410, setting data 422 related to setting of the food management server 4, a food management database 423, and other various kinds of data. The server storage unit 420 has a non-volatile storage region. The server storage unit 420 may also have a volatile storage region and provide a work area of the server processor 410.

FIG. 6 is a diagram illustrating an example of the food management database 423.

The food management database 423 is a database in which various kinds of information related to food items contained in the refrigerator 1 is stored.

One record R stored in the food management database 423 includes a user ID 4231, the refrigerator ID 123, food name information 4232, remaining number information 4233, storage place information 4234, storage start date information 4235, deadline date information 4236, deadline date notification timing information 4237, new-notification timing information 4238, and food image data 4239.

Note that one record R stored in the food management database 423 may further include one or a plurality of different kinds of information.

The user ID 4231 is identification information that identifies the user P using the food management app 323, and is appropriately allocated to the user P using the food management app 323.

The refrigerator ID 123 is identification information for identifying the refrigerator 1. The refrigerator ID 123 is, for example, a manufacturing number of the refrigerator 1 or a serial number of the refrigerator 1.

The food name information 4232 is information indicating a food name. In one record R, one or a plurality of pieces of the food name information 4232 are associated with the user ID 4231.

The remaining number information 4233 is information indicating a remaining number of food items. In one record R, pieces of the remaining number information 4233 in a number equal to the number of pieces of the food name information 4232 corresponding to the user ID 4231 are associated. Each remaining number of food items indicated by the remaining number information 4233 in FIG. 6 is indicated in a unit corresponding to a food name. Each remaining number indicated by the remaining number information 4233 is appropriately updated by the server control unit 40.

The storage place information 4234 is information indicating a storage place of a food item. In the present embodiment, the storage place information 4234 indicates, as a storage place, any of the housing compartments included in the refrigerator 1. In one record R, pieces of the storage place information 4234 in a number equal to the number of pieces of the food name information 4232 corresponding to the user ID 4231 are associated.

The storage start date information 4235 is information indicating a storage start date of a food item. In one record R, pieces of the storage start date information 4235 in a number equal to the number of pieces of the food name information 4232 corresponding to the user ID 4231 are associated.

The deadline date information 4236 is information indicating a deadline date of a food item, such as a best-before date or a use-by date. In one record R, pieces of the deadline date information 4236 in a number equal to the number of pieces of the food name information 4232 corresponding to the user ID 4231 are associated.

The deadline date notification timing information 4237 is information indicating a timing at which the user P is notified of a deadline date indicated by the corresponding deadline date information 4236. As illustrated in FIG. 6, the timing indicated by the deadline date notification timing information 4237 is a timing such as the number of days before the deadline date indicated by the deadline date information 4236. In one record R, pieces of the deadline date notification timing information 4237 in a number equal to the number of pieces of the food name information 4232 corresponding to the user ID 4231 are associated.

The new-notification timing information 4238 is information indicating a timing at which it is notified that a food item is newly contained in the refrigerator 1. As illustrated in FIG. 6, the timing indicated by the new-notification timing information 4238 is a timing such as the number of days since a storage start date indicated by the storage start date information 4235.

The food image data 4239 is image data of a food image FG that is an image of a food item. In one record R, pieces of the food image data 4239 in a number equal to the number of pieces of the food name information 4232 corresponding to the user ID 4231 are associated.

Back in description of FIG. 5, the server communication unit 41 includes communication hardware such as a communication circuit and a connector compatible with a predetermined communication standard, and communicates with equipment connected to the global network GN in accordance with a predetermined communication standard under control of the server control unit 40. In the present embodiment, the server communication unit 41 communicates with the refrigerator 1 and the terminal device 3.

As described above, the server control unit 40 functions as the food recognition unit 4100.

The food recognition unit 4100 recognizes a food item detected by the food detection unit 100D. Details of the food recognition unit 4100 will be described with reference to FIG. 8.

A functional configuration of the terminal device 3 will be described next.

The terminal device 3 includes a terminal control unit 30, a terminal communication unit 31, and the touch panel 32.

The terminal control unit 30 includes a terminal processor 310 that is a processor such as a CPU or an MPU configured to execute a computer program, and a terminal storage unit 320, and controls each component of the terminal device 3. The terminal control unit 30 executes various kinds of processing through hardware and software cooperation so that the terminal processor 310 reads a control program 321 stored in the terminal storage unit 320 and executes processing. The food management app 323 is installed on the terminal device 3 in advance. The food management app 323 is a computer program configured to cause the terminal control unit 30 to function as an app execution unit 3100 when read from the terminal storage unit 320 and executed by the terminal processor 310.

The terminal storage unit 320 has a storage region in which a computer program executed by the terminal processor 310 and data processed by the terminal processor 310 are stored. The terminal storage unit 320 stores the control program 321 executed by the terminal processor 310, setting data 322 related to setting of the terminal device 3, the food management app 323, the user ID 4231, and other various kinds of data. The terminal storage unit 320 has a non-volatile storage region. The terminal storage unit 320 may also have a volatile storage region and provide a work area of the terminal processor 310.

The terminal communication unit 31 includes communication hardware such as a communication circuit compatible with a predetermined communication standard, and communicates with equipment connected to the global network GN in accordance with the predetermined communication standard under control of the terminal control unit 30. In the present embodiment, the terminal communication unit 31 communicates with the food management server 4 in accordance with the predetermined communication standard in accordance with control of the app execution unit 3100. In the present embodiment, the communication standard used by the terminal communication unit 31 is a wireless communication standard as an example but may be a wired communication standard.

The touch panel 32 includes a display panel such as a liquid crystal display panel, and a touch sensor placed over or integrated with the display panel. The display panel displays various images under control of the terminal control unit 30. The touch sensor detects a touch operation and performs outputting to the terminal control unit 30. The terminal control unit 30 executes processing corresponding to the touch operation based on the input from the touch sensor.

As described above, the terminal control unit 30 functions as the app execution unit 3100.

The app execution unit 3100 controls the terminal communication unit 31 and transmits and receives various kinds of information to and from the food management server 4. The app execution unit 3100 transmits and receives various kinds of information to and from the food management server 4 through the communication device 5 when communication connection is possible between the terminal device 3 and the communication device 5, and the app execution unit 3100 transmits and receives various kinds of information to and from the food management server 4 not through the communication device 5 otherwise. Thus, even when the user P is not positioned in the home H nor around the home H, the terminal device 3 can transmit and receive various kinds of information to and from the food management server 4 by using the functions of the food management app 323.

The app execution unit 3100 displays, on the touch panel 32, a user interface related to management of a food item contained in the refrigerator 1. In description below, the user interface is referred to as a "food management UI" denoted by a reference sign "3200". By displaying a food management UI 3200 on the touch panel 32, the app execution unit 3100 provides various kinds of information related to a food item contained in the refrigerator 1 to the user P and receives various inputs related to a food item contained in the refrigerator 1 from the user P.

2. Operation

Operation of each component of the food management system 1000 will be described next.

Operation of each component of the food management system 1000 related to food management will be described first.

FIG. 7 is a flowchart illustrating operation of the refrigerator 1.

In the operation illustrated in FIG. 7, the sensor unit 103 outputs detected values of various sensors to the refrigerator control unit 100. Then, in the operation illustrated in FIG. 7, the detected value processing unit 100A executes processing based on the various detected values received from the sensor unit 103.

The image capturing control unit 100B of the camera module 220 determines whether or not a person exists around the refrigerator 1 (step SA1).

When having acquired person existence information indicating that a person exists from the detected value processing unit 100A, the image capturing control unit 100B makes positive determination at step SA1. When having acquired person existence information indicating that no person exists from the detected value processing unit 100A, the image capturing control unit 100B makes negative determination at step SA1.

When having determined that a person exists around the refrigerator 1 (YES at step SA1), the image capturing control unit 100B starts moving image capturing with the refrigerator compartment camera 21 and the drawer camera 22 (step SA3).

When having determined that no person exists around the refrigerator 1 (NO at step SA1), the image capturing control unit 100B determines whether or not any of the left door 11A, the right door 11B, and the drawers 12A, 13A, 14A, and 15A is in the opened state (step SA2).

When having acquired opened-or-closed state information indicating the opened state from the detected value processing unit 100A, the image capturing control unit 100B makes positive determination at step SA2. When having acquired opened-or-closed state information indicating the closed state from the detected value processing unit 100A, the image capturing control unit 100B makes negative determination at step SA2.

When having determined that none of the left door 11A, the right door 11B, and the drawers 12A, 13A, 14A, and 15A is in the opened state (NO at step SA2), the image capturing control unit 100B returns processing to step SA1 and executes the processing at step SA1 again.

When having determined that any of the left door 11A, the right door 11B, and the drawers 12A, 13A, 14A, and 15A is in the opened state (YES at step SA2), the image capturing control unit 100B executes processing at step SA3.

When image capturing is started at step SA3, the moving image processing unit 100C executes processing at steps SA4 to SA8 for each frame included in a moving image.

When image capturing is started by the refrigerator compartment camera 21 and the drawer camera 22, the moving image processing unit 100C acquires opened-or-closed state information from the detected value processing unit 100A (step SA4).

Subsequently, the moving image processing unit 100C performs size reduction of a captured image of one frame for an image capturing result of each of the refrigerator compartment camera 21 and the drawer camera 22 (step SA5). The size reduction is what is called resizing.

The moving image processing unit 100C stores the captured image of one frame, which is provided with size reduction, and the opened-or-closed state information acquired at step SA4 in association with each other in the refrigerator storage unit 120 (step SA6). Note that the moving image processing unit 100C stores the images in a temporally sequential manner each time step SA6 is performed.

Subsequently, similarly to step SA1, the image capturing control unit 100B determines whether or not a person exists around the refrigerator 1 (step SA7).

When the image capturing control unit 100B has determined that a person exists around the refrigerator 1 (YES at step SA7), the moving image processing unit 100C executes the processing at step SA4 and later again.

When having determined that no person exists around the refrigerator 1 (NO at step SA7), similarly to step SA2, the image capturing control unit 100B determines whether or not each of the left door 11A, the right door 11B, and the drawers 12A, 13A, 14A, and 15A is in the closed state (step SA8).

When the image capturing control unit 100B has determined that none of the left door 11A, the right door 11B, and the drawers 12A, 13A, 14A, and 15A is in the closed state (NO at step SA8), the moving image processing unit 100C executes the processing at step SA4 and later again.

When having determined that each of the left door 11A, the right door 11B, and the drawers 12A, 13A, 14A, and 15A are in the closed state (YES at step SA8), the image capturing control unit 100B ends image capturing by the refrigerator compartment camera 21 and the drawer camera 22 (step SA9).

Operation related to food management based on image capturing results of the refrigerator compartment camera 21 and the drawer camera 22 will be described next.

Figure 8:
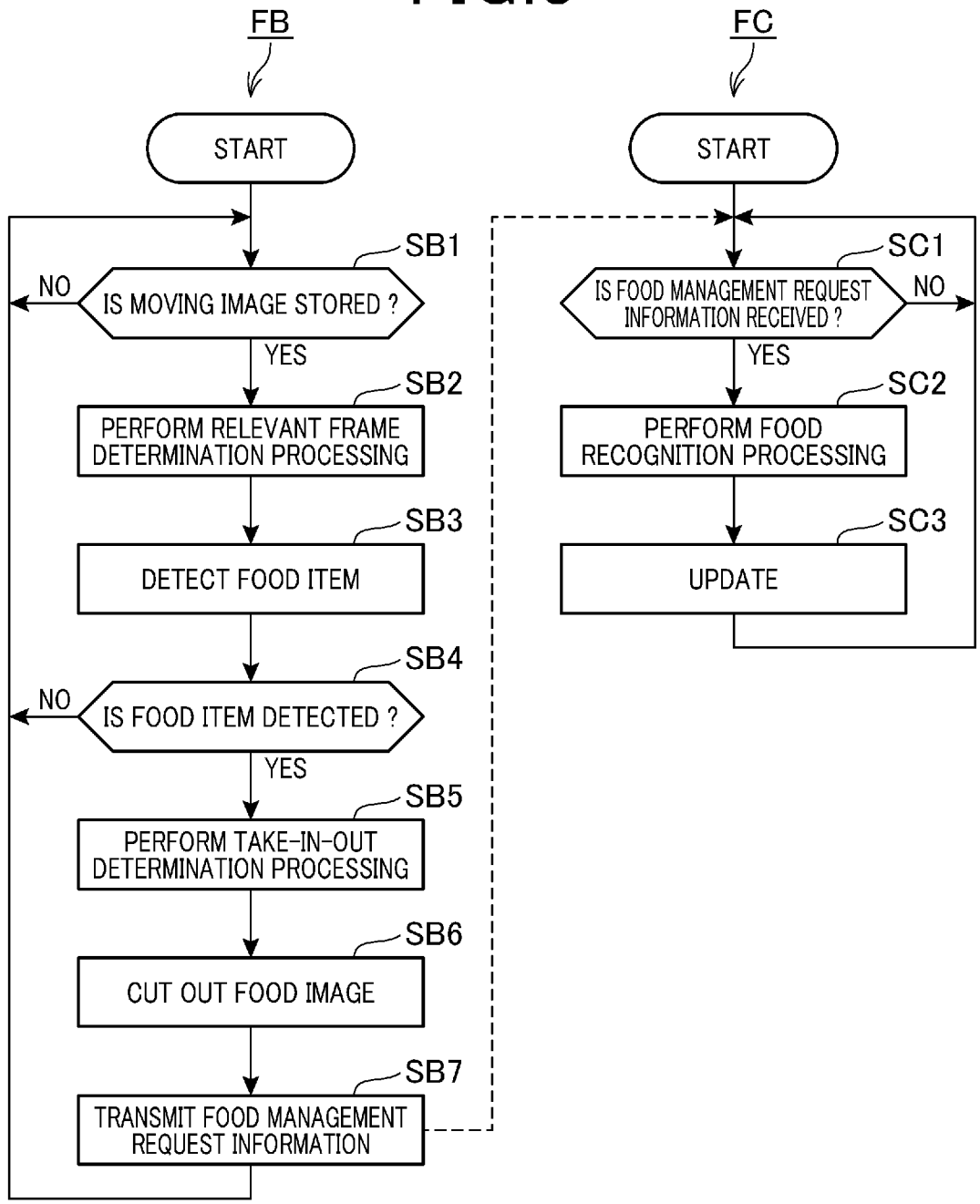
FIG. 8 is a flowchart illustrating operation of the refrigerator and the food management server.

FIG. 8 is a flowchart illustrating operation of the refrigerator 1 and the food management server 4. In FIG. 8, a flowchart FB illustrates the operation of the refrigerator 1. In FIG. 8, a flowchart FC illustrates the operation of the food management server 4.

The food detection unit 100D of the refrigerator 1 determines whether or not a moving image that is an image capturing result of the refrigerator compartment camera 21 or the drawer camera 22 is stored in the refrigerator storage unit 120 (step SB1).

When having determined that no moving image is not stored in the refrigerator storage unit 120 (NO at step SB1), the food detection unit 100D executes the processing at step SB1 again.

When having determined that such a moving image is stored in the refrigerator storage unit 120 (YES at step SB1), the food detection unit 100D executes relevant frame determination processing (step SB2).

The relevant frame determination processing is processing that determines a relevant frame among frames included in the moving image stored in the refrigerator storage unit 120, extracts a frame determined as the relevant frame from the moving image, and discards any frame not specified as the relevant frame from the moving image. The relevant frame is a frame in which an image when at least one of the left door 11A, the right door 11B, and the drawers 12A, 13A, 14A, and 15A is in the opened state is photographed.

A plurality of methods of determining the relevant frame in the relevant frame determination processing will be described below.

<First Method>

A first method is determination based on opened-or-closed state information corresponding to a frame.

In the relevant frame determination, the food detection unit 100D determines that a frame corresponding to opened-or-closed state information indicating the opened state is the relevant frame and that a frame corresponding to opened-or-closed state information indicating the closed state is not the relevant frame.

<Second Method>

A second method is determination by image difference extraction.

The food detection unit 100D performs difference extraction of frames of the moving image to specify a frame in which an image when any of the left door 11A, the right door 11B, and the drawers 12A, 13A, 14A, and 15A is in the opened state is photographed. Then, the food detection unit 100D determines that the specified frame is the relevant frame and any frame other than the specified frame is not the relevant frame. For example, the food detection unit 100D performs difference extraction for each frame of the closed state and determines, as the relevant frame, a frame in which difference exists at any of the left door 11A, the right door 11B, and the drawers 12A, 13A, 14A, and 15A. Note that a frame of the closed state as a reference of difference extraction is, for example, an oldest frame among the frames of the moving image.

<Third Method>

A third method is determination based on the first method and the second method.

The food detection unit 100D determines, as the relevant frame, a frame corresponding to opened-or-closed state information indicating the opened state. Subsequently, the food detection unit 100D performs difference extraction for a frame of the closed state on a frame corresponding to opened-or-closed state information indicating the closed state and determines, as the relevant frame, a frame in which difference exists at any of the left door 11A, the right door 11B, and the drawers 12A, 13A, 14A, and 15A.

Having executed the relevant frame determination processing, the food detection unit 100D detects a food item taken into or out of the refrigerator 1 from the relevant frame (step SB3). In the processing at step SB3, when a food item is detected from the relevant frame, the kind of the detected food item and a housing compartment that the food item is taken into or out of are detected as well. Note that the food detection unit 100D detects the kind of the food item as a classification higher than a food name. For example, when the food item actually taken into or out of the housing compartment is a packet of milk, the food detection unit 100D detects the kind of the food item as a "packet of drink" at step SB3.

For example, the food detection unit 100D detects a food item taken into or out of the refrigerator 1 from the relevant frame based on characteristic amounts such as shape and color. The food detection unit 100D also detects the kind of the detected food item based on characteristic amounts such as shape and color. The food detection unit 100D also detects a housing compartment that the detected food item is taken into or out of based on the kind of a camera, the size of an image of a drawer 16A photographed in the relevant frame, and the like.

Data necessary for the detection at step SB3 is stored in a storage region that is acquirable by the refrigerator control unit 100.

The food detection unit 100D determines whether or not a food item taken into or out of the refrigerator 1 is detected from the relevant frame (step SB4).

When having determined that a food item taken into or out of the refrigerator 1 cannot be detected from the relevant frame (NO at step SB4), the food detection unit 100D returns processing to step SB1 and executes the processing at step SB1 and later again. Note that the food detection unit 100D may discard the relevant frame until step SB1 is executed again after negative determination at step SB4. Accordingly, an unnecessary moving image in which no food item is detected can be prevented from being continuously stored in the refrigerator storage unit 120.

When having determined that a food item taken into or out of the refrigerator 1 is detected (YES at step SB4), the food detection unit 100D performs take-in-out determination processing (step SB5).

The take-in-out determination processing is processing that determines whether the food item detected at step SB3 is a food item taken into or out of the refrigerator 1.

For example, in the take-in-out determination processing, the food detection unit 100D determines, based on the relevant frame, a direction in which an image of the food item detected at step SB3 moves in the moving image. When the moving direction of the image of the food item is the back direction, in other words, a direction approaching the refrigerator 1, the food detection unit 100D determines that the detected food item is a food item taken into the refrigerator 1. When the moving direction of the image of the food item is the front direction, in other words, a direction departing from the refrigerator 1, the food detection unit 100D determines that the detected food item is a food item taken out of the refrigerator 1.

Subsequently, the food detection unit 100D cuts out the food image FG of the detected food item from the relevant frame (step SB6).

In description below, the food image FG thus cut out is referred to as a "cut-out food image".

The food detection unit 100D transmits, to the food management server 4 through the refrigerator communication unit 101, food management request information that requests the food management server 4 for food management (step SB7).

The food management request information transmitted to the food management server 4 includes the refrigerator ID 123 stored in the refrigerator storage unit 120.

The food management request information transmitted to the food management server 4 also includes date-time information indicating date and time when moving image capturing is performed.

The food management request information transmitted to the food management server 4 also includes, for each food item detected at step SB3, image data of the cut-out food image, take-in-out determination result information indicating a determination result of the take-in-out determination processing, the storage place information 4234 indicating a detected place that the food item is taken into or taken out of, and food kind information indicating the kind of the detected food item.

As illustrated in the flowchart FC, the food recognition unit 4100 of the server control unit 40 of the food management server 4 determines whether or not the food management request information is received through the server communication unit 41 (step SC1).

When having determined that no food management request information is received (NO at step SC1), the food recognition unit 4100 executes the processing at step SC1 again.

When having determined that the food management request information is received (YES at step SC1), the food recognition unit 4100 performs food recognition processing based on the cut-out food image indicated by image data included in the food management request information (step SC2).

The food recognition processing in the present embodiment is processing that recognizes a food item from the cut-out food image and acquires the food image FG and the food name information 4232 of the recognized food item from a food information database.

The food information database is a database that stores information related to a food item, and stores, for example, image data of the food image FG and the food name information 4232 for each food item. The food information database may be stored in the food management server 4 or may be stored in equipment with which the food management server 4 can communicate.

For example, the food recognition is performed as described below.

The food recognition unit 4100 specifies the food image FG having a highest degree of matching with the cut-out food image from among the food images FG stored in the food information database. The degree of matching is calculated by, for example, a predetermined algorithm based on characteristic amounts such as shape and color. Then, the food recognition unit 4100 recognizes that a food item indicated by the specified food image FG is a food item indicated by the cut-out food image.

Note that the food recognition unit 4100 may perform the food recognition by artificial intelligence (AI). For example, a learned model is established by performing machine learning processing that learns characteristic amounts of a food item, such as color and shape, from teacher food images FG. The learned model is stored in the server storage unit 420. The food recognition unit 4100 refers to the learned model with the food image FG included in the food management request information as input data and recognizes a food item indicated by the food image FG. The learned model may be stored in equipment other than the food management server 4 connected to the global network GN, and a food item may be recognized at the food management server 4. In this case, the food recognition unit 4100 transmits the food image included in the food management request information to the equipment in which the learned model is stored, and acquires a food item specification result from the equipment. Then, the food recognition unit 4100 recognizes that a food item indicated by the acquired specification result is a food item indicated by the cut-out food image.

Having performed the food recognition, the food recognition unit 4100 acquires the food image FG and the food name information 4232 of the recognized food item from the food information database.

Subsequently, the food recognition unit 4100 having performed the food recognition processing updates the food management database 423 based on a processing result of the food recognition processing (step SC3).

Step SC3 will be described below in detail.

First, the food recognition unit 4100 specifies, from the food management database 423, a record R including the refrigerator ID 123 included in the food management request information.

Subsequently, the food recognition unit 4100 determines whether the recognized food item is a food item taken into the refrigerator 1 or a food item taken out of the refrigerator 1 based on the take-in-out determination result information included in the received food management request information.

When having determined that the recognized food item is a food item taken out of the refrigerator 1, the food recognition unit 4100 updates information corresponding to the food name information 4232 of the recognized food item in the specified record R.

More specifically, the food recognition unit 4100 performs processing that decreases the remaining number indicated by the remaining number information 4233. The number to be decreased is calculated based on the food image FG included in the food management request information in the food recognition processing, for example. When the remaining number information 4233 after update indicates zero, the food recognition unit 4100 may leave the storage start date indicated by the storage start date information 4235 and the deadline date indicated by the deadline date information 4236 as blanks.

When having determined that the recognized food item is a food item taken into the refrigerator 1 and is a food item taken into the refrigerator 1 in the past, the food recognition unit 4100 updates information corresponding to the food name information 4232 of the recognized food item in the specified record R.

More specifically, the food recognition unit 4100 performs processing that increases the remaining number indicated by the remaining number information 4233. The number to be increased is calculated based on the cut-out food image included in the food management request information in the food recognition processing, for example. The food recognition unit 4100 also performs processing that changes the date indicated by the date-time information included in the food management request information to the storage start date indicated by the storage start date information 4235. The food recognition unit 4100 also performs processing that acquires, by a predetermined method such as computation or query, a deadline date based on the date indicated by the date-time information included in the food management request information and changes the deadline date indicated by the deadline date information 4236 to the acquired deadline date.

When having determined that the recognized food item is a food item taken into the refrigerator 1 and is a food item not taken into the refrigerator 1 in the past, the food recognition unit 4100 associates new various kinds of information with the user ID 4231 in the specified record R.

The various kinds of information associated with the user ID 4231 in the specified record R include the food name information 4232, the remaining number information 4233, the storage place information 4234, the storage start date information 4235, the deadline date information 4236, the deadline date notification timing information 4237, the new-notification timing information 4238, and the food image data 4239.

The food name information 4232 is the food name information 4232 acquired in the food recognition processing.

The remaining number information 4233 indicates, for example, a remaining number calculated based on the cut-out food image included in the food management request information in the food recognition processing.

The storage place information 4234 is the storage place information 4234 included in the food management request information.

The storage start date information 4235 indicates the date indicated by the date-time information included in the food management request information.

The deadline date information 4236 indicates a deadline date based on the date indicated by the date-time information included in the food management request information, or a blank.

The deadline date notification timing information 4237 and the new-notification timing information 4238 indicate default timings or blanks.

The food image data 4239 indicates the food image FG acquired in the food recognition processing.

As described above, in the food management system 1000, the refrigerator 1 determines the relevant frame from a moving image of an image capturing result, detects a food item from the relevant frame, and cuts out the food image FG of the detected food item from the relevant frame. Then, in the food management system 1000, the food management server 4 performs food recognition from the cut-out food image. With such division of roles, food recognition can be performed at the food management server 4 with a reduced amount of data transmission from the refrigerator 1 to the food management server 4. Accordingly, in the food management system 1000, a food item taken into or out of the refrigerator 1 can be recognized with reduced increase in an amount of communication.

Operation of the food management system 1000 when the app execution unit 3100 displays a food management screen SKG on the food management UI 3200 will be described next. The food management screen SKG is a screen related to management of food items contained in the refrigerator 1.

The food management screen SKG will be described first before description of the operation.

Figure 9:
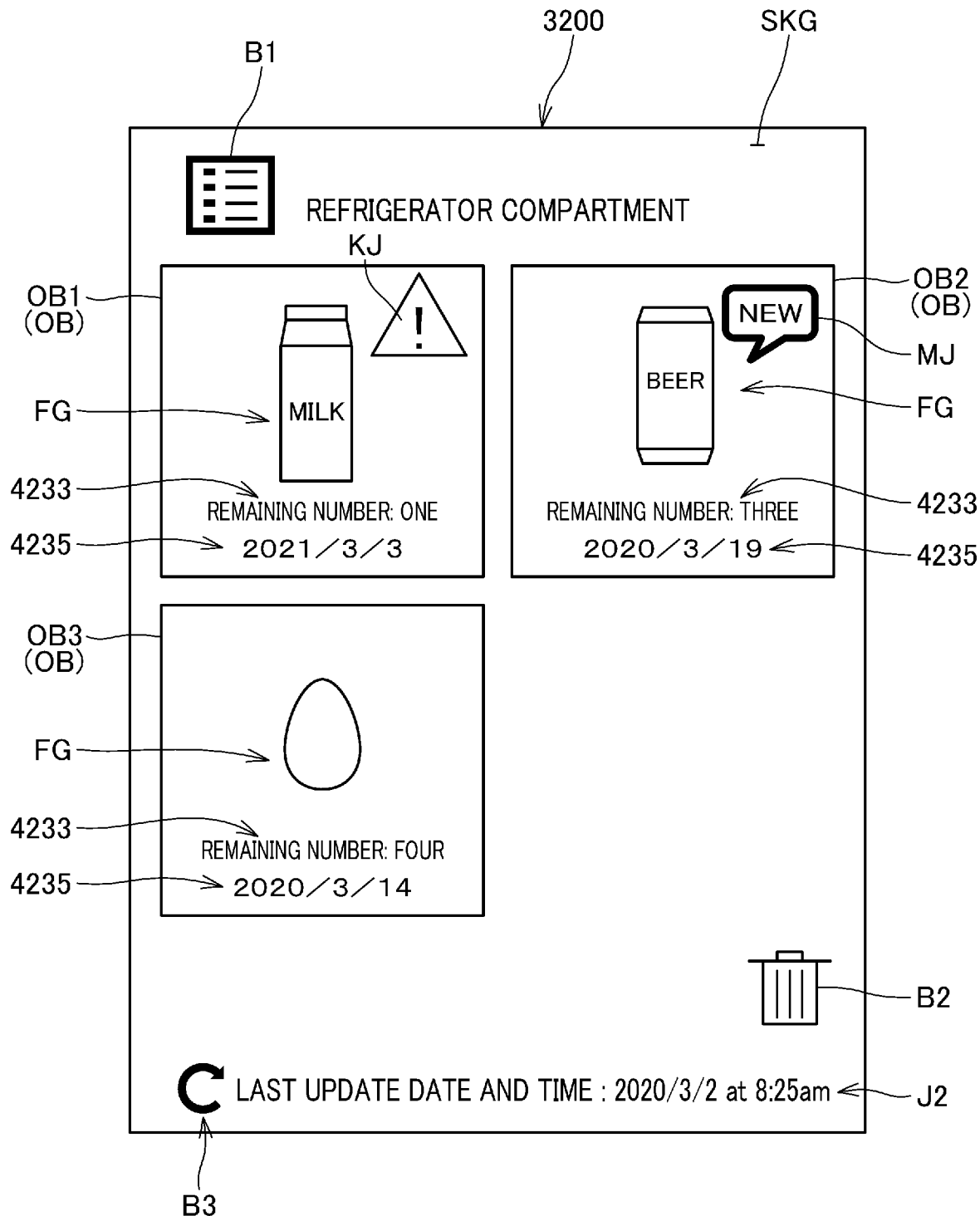
FIG. 9 is a diagram illustrating an example of a food management screen.

FIG. 9 is a diagram illustrating an example of the food management screen SKG.

The food management screen SKG includes an object OB related to each food item. The food management screen SKG illustrated in FIG. 9 includes an object OB1 related to a packet of milk, an object OB2 related to a can of beer, and an object OB3 related to an egg.

One object OB includes the food image FG, the remaining number information 4233, and the storage start date information 4235. When the deadline date of a food item corresponds to a timing indicated by the deadline date notification timing information 4237, one object OB includes deadline date warning information KJ warning that the deadline date of the food item is near. When the storage start date of a food item corresponds to a timing indicated by the new-notification timing information 4238, one object OB includes new-housing indicating information MJ clearly indicating a newly contained food item.

The object OB1 illustrated in FIG. 9 includes a food image FG1 illustrating a packet of milk, the remaining number information 4233 indicating the remaining number of packets of milk, the storage start date information 4235 indicating the storage start date of each packet of milk, and the deadline date warning information KJ.

The object OB2 illustrated in FIG. 9 includes a food image FG2 illustrating a can of beer, the remaining number information 4233 indicating the remaining number of cans of beer, the storage start date information 4235 indicating the storage start date of each can of beer, and the new-housing indicating information MJ.

The object OB3 illustrated in FIG. 9 includes a food image FG3 illustrating an egg, the remaining number information 4233 indicating the remaining number of eggs, and the storage start date information 4235 indicating the storage start date of each egg.

The food management screen SKG includes a housing compartment switching button B1. The housing compartment switching button B1 is a software button for switching the kind of an object OB displayed on the food management screen SKG for each housing compartment of the refrigerator 1. When the housing compartment switching button B1 is operated by a touch, the names of the housing compartments of the refrigerator 1 are displayed in a list on the food management screen SKG. When one housing compartment is selected from the list by a touch operation, an object OB for the storage place information 4234 indicating the selected housing compartment is displayed on the food management screen SKG.

The food management screen SKG includes a delete button B2. The delete button B2 is a software button for deleting an object OB from display on the food management screen SKG. When the delete button B2 is selected by a touch operation while one or a plurality of objects OB are selected, each selected object OB becomes not displayed on the food management screen SKG. In addition, in the food management database 423, various kinds of information related to a food item represented by each object OB selected when the delete button B2 is operated are deleted.

The food management screen SKG includes an update button B3 and update date-time information J2 indicating the latest update date and time. The update button B3 is a software button for updating an object OB displayed on the food management screen SKG and various kinds of information of the object OB. When the update button B3 is operated by a touch, update date and time indicated by the update date-time information J2 are changed to the latest date and time when update is performed.

Operation of the food management system 1000 when the app execution unit 3100 displays the food management screen SKG in the food management UI 3200 will be described below with reference to FIG. 10.

Figure 10:
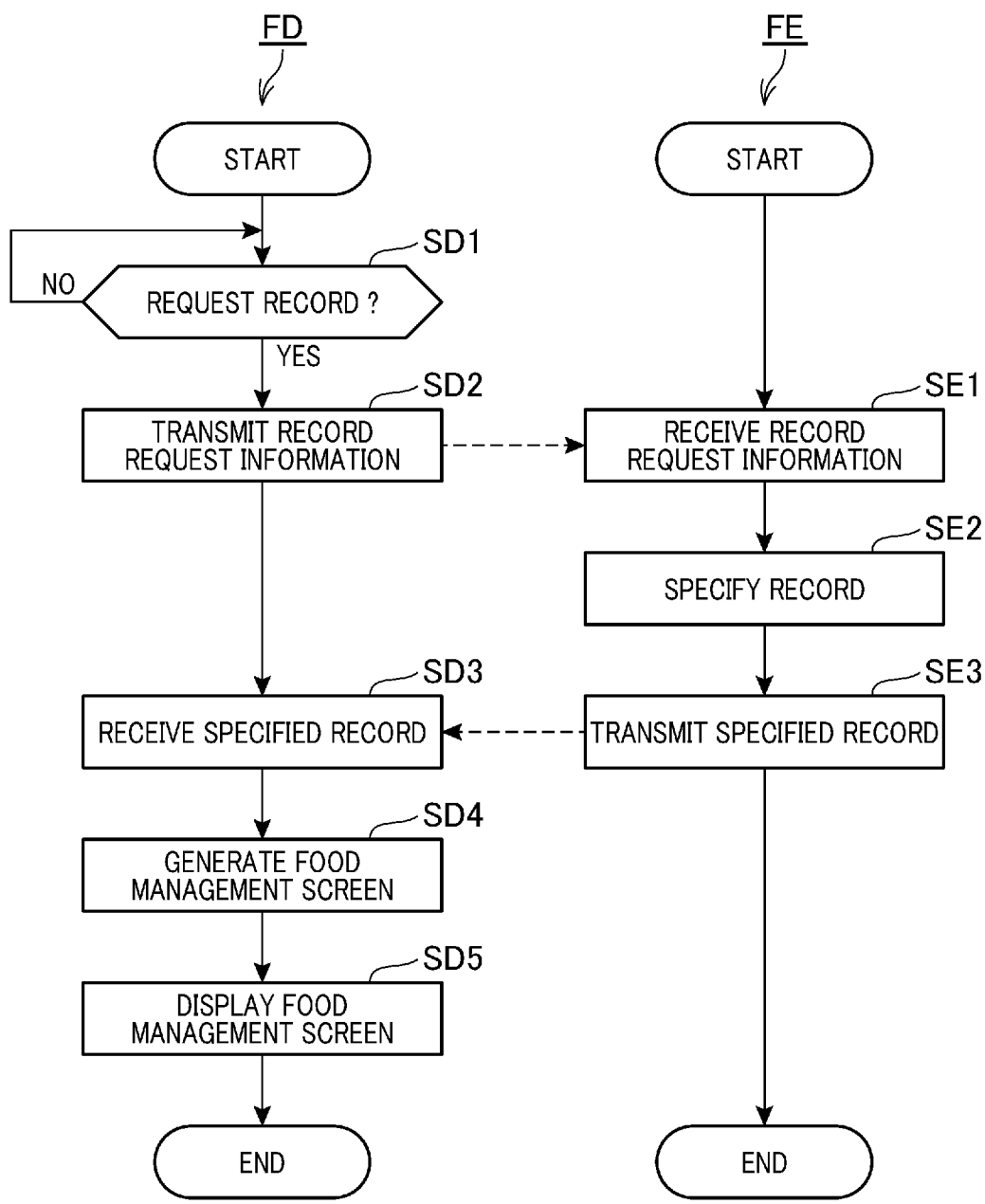
FIG. 10 is a flowchart illustrating operation of the terminal device and the food management server.

FIG. 10 is a flowchart illustrating operation of the terminal device 3 and the food management server 4. In FIG. 10, a flowchart FD illustrates the operation of the terminal device 3, and a flowchart FE illustrates the operation of the food management server 4.

The app execution unit 3100 of the terminal device 3 determines whether or not to request a record R from the food management server 4 (step SD1).

For example, when a touch operation to instruct display of the food management screen SKG is received through the food management UI 3200, the app execution unit 3100 makes positive determination at step SD1.

For example, when the update button B3 is operated by a touch on the food management screen SKG, the app execution unit 3100 makes positive determination at step SD1.

When having determined to request the record R (YES at step SD1), the app execution unit 3100 transmits record request information that requests the record R to the food management server 4 through the terminal communication unit 31 (step SD2). The record request information transmitted at step SD2 includes the user ID 4231 stored in the terminal storage unit 320.

As illustrated in the flowchart FE, when the record request information is received by the server communication unit 41 (step SE1), the server control unit 40 of the food management server 4 specifies, in the food management database 423, the record R including the user ID 4231 included in the received record request information (step SE2).

Then, the server control unit 40 transmits the record R specified by the server communication unit 41 to the terminal device 3 (step SE3).

As illustrated in the flowchart FD, when the record R is received by the terminal communication unit 31 (step SD3), the app execution unit 3100 of the terminal device 3 generates the food management screen SKG (step SD4).

The processing at step SD4 will be described below in detail with an example in which the record R illustrated in FIG. 6 is received and the food management screen SKG illustrated in FIG. 9 is generated.

The app execution unit 3100 determines whether or not the current day corresponds to a timing indicated by the deadline date notification timing information 4237 corresponding to the food name information 4232 indicating a packet of milk. In a case of generation of the object OB1 in FIG. 9, the app execution unit 3100 makes positive determination and generates the deadline date warning information KJ. Note that no deadline date warning information KJ is generated when negative determination is made.

Subsequently, the app execution unit 3100 determines whether or not a storage start date indicated by the storage start date information 4235 corresponding to the food name information 4232 indicating a packet of milk corresponds to a timing indicated by the new-notification timing information 4238 corresponding to the food name information 4232 indicating a packet of milk. In generation of the object OB in FIG. 9, the app execution unit 3100 makes negative determination and generates no new-housing indicating information MJ. Note that the app execution unit 3100 generates the new-housing indicating information MJ when positive determination is made.

The app execution unit 3100 generates the object OB1 including the generated deadline date warning information KJ, the food image FG indicated by the food image data 4239 corresponding to the food name information 4232 indicating a packet of milk, and the storage start date information 4235 corresponding to the food name information 4232 indicating a packet of milk.

Note that the app execution unit 3100 includes no deadline date warning information KJ in the object OB1 when no deadline date warning information KJ is generated, and the app execution unit 3100 includes the new-housing indicating information MJ in the object OB1 when the new-housing indicating information MJ is generated.

Similarly to the object OB1, the app execution unit 3100 generates each of the objects OB2 and OB3 and includes the generated objects OB1, OB2, and OB3 on the food management screen SKG.

Note that, although the app execution unit 3100 generates an object OB related to an onion, the object OB related to an onion is not included in the food management screen SKG illustrated in FIG. 9 because the food management screen SKG illustrated in FIG. 9 is a screen that displays any object OB contained in the refrigerator compartment 11. The object OB related to an onion is included in the food management screen SKG that displays any object OB contained in the vegetable compartment 15.

Back in description of the flowchart FD illustrated in FIG. 9, when having generated the food management screen SKG, the app execution unit 3100 displays the generated food management screen SKG on the food management UI 3200 (step SD5).

Note that, on the above-described food management screen SKG, displayed information can be corrected for each food item by the user P. Information that can be corrected is various kinds of information corresponding to the user ID 4231 in the food management database 423. When information is corrected on the food management screen SKG, the app execution unit 3100 transmits update request information that requests update of the food management database 423 to the food management server 4. Then, the food management server 4 updates the food management database 423 based on the received update request information. For example, when the remaining number information 4233 of a can of beer is corrected from three to two, the app execution unit 3100 transmits, to the food management server 4, update request information with which the remaining number information 4233 corresponding to the food name information 4232 of a can of beer is updated to the remaining number information 4233 indicating the remaining number of two. Then, the food management server 4 updates the remaining number indicated by the remaining number information 4233 from three to two. In this manner, information can be corrected by the user P, and thus the food management system 1000 can perform appropriate food management even in cases of false food detection at the refrigerator 1 and false food recognition at the food management server 4. Note that, when the food recognition unit 4100 performs food recognition by AI, the food recognition unit 4100 may perform machine learning of contents corrected by the user P and reflect the corrected contents on the learned model.

3. Effects and Others

As described above, the food management system 1000 manages a food item contained in the refrigerator 1. The food management system 1000 includes the refrigerator compartment camera 21 provided at the upper part the of refrigerator 1 and configured to capture an image of an image capturing range including the opening 10A of the refrigerator compartment 11 of the refrigerator 1, the drawer camera 22 provided at the upper part of the refrigerator 1 and configured to capture an image of an image capturing range including a drawer 16A pulled out of a housing compartment other than the refrigerator compartment 11, and the food detection unit 100D configured to detect a food item taken into or out of the refrigerator 1 based on an image capturing result of at least one of the refrigerator compartment camera 21 and the drawer camera 22.

The refrigerator 1 includes the refrigerator compartment camera 21 provided at the upper part of the refrigerator 1 and configured to capture an image of an image capturing range including the opening 10A of the refrigerator compartment 11 of the refrigerator 1, the drawer camera 22 provided at the upper part of the refrigerator 1 and configured to capture an image of an image capturing range including a drawer 16A pulled out of a housing compartment other than the refrigerator compartment 11, and the food detection unit 100D configured to detect a food item taken into or out of the refrigerator 1 based on an image capturing result of at least one of the refrigerator compartment camera 21 and the drawer camera 22.

According to the food management system 1000 and the refrigerator 1, it is possible to detect a food item taken into or out of a housing compartment in which a food item is contained in a drawer 16A in addition to a food item taken into or out of the refrigerator compartment 11 based on an image capturing result, and thus it is possible to accurately detect a food item taken into or out of the refrigerator 1. Moreover, according to the food management system 1000, it is possible to accurately detect a food item taken into or out of the refrigerator 1, and thus it is possible to accurately manage a food item contained in the refrigerator 1.

In addition, according to the food management system 1000 and the refrigerator 1, since image capturing is performed in different image capturing ranges with two cameras, it is possible to reduce the image capturing range of each camera as compared to a case in which image capturing is performed in image capturing ranges of two cameras with one camera. Accordingly, unnecessary information can be prevented from being included in an image capturing result of each camera, and thus the food management system 1000 and the refrigerator 1 can reduce a processing load in detection of a food item from the image capturing result and can more accurately detect a food item from the image capturing result.

The food management system 1000 includes the food recognition unit 4100 configured to recognize a food item detected by the food detection unit 100D.

With this configuration, since an accurately detected food item is recognized, a food item taken into or out of the refrigerator 1 can be recognized based on a food item actually taken into or out of the refrigerator 1.

The food management system 1000 includes the refrigerator 1 including the refrigerator compartment camera 21, the drawer camera 22, and the food detection unit 100D.

With this configuration, the refrigerator 1 can detect a food item taken into or out of the refrigerator 1, and thus it is not needed to provide, for example, a dedicated equipment configured to detect a food item, and accordingly, a system configuration of the food management system 1000 can be simplified.

The refrigerator 1 includes the opening-closing sensors 1039 configured to detect opening and closing of the doors 11C and the drawers 16A. The refrigerator compartment camera 21 and the drawer camera 22 start image capturing when the opening-closing sensors 1039 have detected an opened state, and the refrigerator compartment camera 21 and the drawer camera 22 end image capturing when the opening-closing sensors 1039 have detected a closed state.

With this configuration, a food item taken into or out of the refrigerator 1 can be more accurately included in an image capturing result and unnecessary image capturing can be prevented. Thus, it is possible to more accurately detect a food item taken into or out of the refrigerator 1 while preventing unnecessary image capturing.

The refrigerator compartment camera 21 and the drawer camera 22 capture a moving image.

With this configuration, a food item taken into or out of the refrigerator 1 can be accurately included in an image capturing result without depending on a speed of a food item taken in or out, an angle of a hand taking the food item in or out, nor the like as compared to a case in which a still image is captured. Thus, a food item taken into or out of the refrigerator 1 can be more accurately detected with the cameras.

4. Other Embodiments

The embodiments are described above as examples disclosed in the present application. However, the technology of the present disclosure is not limited thereto but is applicable to an embodiment provided with change, replacement, addition, omission, or the like. Constituent components described above in the embodiments may be combined as a new embodiment.

Other embodiments are exemplarily described below.

In the above-described embodiments, the image capturing range of the drawer camera 22 includes the ice compartment 12, the fresh freezing compartment 13, the freezer compartment 14, and the vegetable compartment 15. However, the image capturing range of the drawer camera 22 is not limited to this range but may be a range corresponding to combination of one or a plurality of optional housing compartments. For example, the image capturing range of the drawer camera 22 may be a range including only the freezer compartment 14 and the vegetable compartment 15 or may be a range including only the vegetable compartment 15.

For example, in the above-described embodiments, the refrigerator 1 includes a component having a function to perform image capturing with the camera module 2, in other words, the refrigerator compartment camera 21 and the drawer camera 22. However, the refrigerator 1 may include no component such as the camera module 2 but include the refrigerator compartment camera 21 and the drawer camera 22.

For example, the refrigerator 1 stores the refrigerator ID 123 in the above-described embodiments, but the refrigerator 1 may store identification information that identifies a transmission source of the food management request information in place of the refrigerator ID 123. With this configuration, one record R in the food management database 423 includes, in place of the refrigerator ID 123, identification information that identifies the transmission source of the food management request information.

For example, in the above-described embodiments, a record R is stored in the food management database 423 and a food item detected by the refrigerator 1 is managed by the food management server 4, but the record R may be stored in the terminal storage unit 320 and various kinds of information related to a food item detected by the refrigerator 1 may be managed by the food management app 323. With this configuration, the app execution unit 3100 functions as the food recognition unit 4100 to perform food recognition, and updates contents of the record R stored in the terminal storage unit 320 as appropriate, similarly to the food management server 4 described above. With this configuration, the food management system 1000 does not need to include the food management server 4 and thus has a simpler system configuration.

For example, the kinds of compartments formed in the main box 10 of the refrigerator 1 are not limited to the refrigerator compartment 11, the ice compartment 12, the fresh freezing compartment 13, the freezer compartment 14, and the vegetable compartment 15, but a smaller number of compartments may be formed or another additional kind of compartment may be formed. The number of doors provided at the front opening of the refrigerator compartment 11 may be one.

For example, functions of the refrigerator control unit 100, the terminal control unit 30, and the server control unit 40 may be achieved by a plurality of processors or semiconductor chips.

Each component illustrated in FIGS. 4 and 5 is an example and not particularly limited to a specific implementation. Thus, hardware individually corresponding to each component does not necessarily need to be implemented, and functions of each component may be achieved by one processor executing a computer program. Some functions achieved by software in the above-described embodiments may be achieved by hardware, or some functions achieved by hardware may be achieved by software. Specific detailed configurations of other components of the refrigerator 1, the terminal device 3, and the food management server 4 are optionally changeable without departing from the spirit of the present invention.

For example, step units of the operation illustrated FIGS. 7, 8, and 10 are divisions in accordance with main processing contents to facilitate understanding of operation of each component of the food management system 1000, and the present invention is not limited by a division scheme of processing units and their names. The division into a larger number of step units may be made in accordance with processing contents. The division may be made such that each step unit includes a larger number of processes. Moreover, orders of steps may be interchanged as appropriate without interference with the spirit of the present invention.

Note that the above-described embodiments are merely exemplary description of the technology of the present disclosure, and thus various kinds of change, replacement, addition, omission, and the like may be made within the claims or equivalents thereof.

INDUSTRIAL APPLICABILITY

As described above, a food management system and a refrigerator according to the present invention is applicable to usage in detection of a food item taken into or out of a refrigerator.

REFERENCE SIGNS LIST 1 refrigerator
11 refrigerator compartment
11A left door (door)
11B right door (door)
11C door
12A, 13A, 14A, 15A, 16A drawer
21 refrigerator compartment camera (first camera)
22 drawer camera (second camera)
100D food detection unit
1000 food management system
1031 left door opening-closing sensor (opening-closing sensor)
1032 right door opening-closing sensor (opening-closing sensor)
1033 ice compartment opening-closing sensor (opening-closing sensor)
1034 fresh freezing compartment opening-closing sensor (opening-closing sensor)
1035 freezer compartment opening-closing sensor (opening-closing sensor)
1036 vegetable compartment opening-closing sensor (opening-closing sensor)
1039 opening-closing sensor
4100 food recognition unit

The invention claimed is:

1. A food management system configured to manage a food item contained in a refrigerator, the food management system comprising:
a first camera provided at an upper part of the refrigerator and configured to capture an image of an image capturing range including a door pocket of a door provided at a refrigerator compartment of the refrigerator and an opening of the refrigerator compartment of the refrigerator, when the door is in an opened state;
a second camera provided at the upper part of the refrigerator and configured to capture an image of an image capturing range including a drawer pulled out more frontward of the refrigerator than the door in the opened state, from a housing compartment other than the refrigerator compartment;
a processor configured to detect a food item taken into or out of the refrigerator based on an image capturing result of at least one of the first camera and the second camera;
an opening-closing sensor configured to detect the opened state or a closed state of at least one of the door and the drawer;
an illuminance sensor configured to detect illuminance at a place where the refrigerator is disposed; and
a human detecting sensor configured to detect a person present around the refrigerator, wherein
the first camera and the second camera are located forward of the door in the closed state,
the second camera is positioned more forward than the first camera in the upper part of the refrigerator,
the processor determines whether or not the person is present around the refrigerator based on a detected result of the illuminance sensor and the human detecting sensor, and
the first camera and the second camera start image capturing irrespective of detection of the closed state by the opening-closing sensor when it has been determined that the person is present around the refrigerator, and start image capturing when it has been determined that no person is present around the refrigerator and the opening-closing sensor detects the opened state of any of the door and the drawer.

2. The food management system according to claim 1, comprising a food recognition unit configured to recognize the food item detected by the processor.

3. The food management system according to claim 1, comprising the refrigerator including the first camera, the second camera, and the processor.

4. The food management system according to claim 3, wherein
the first camera and the second camera end image capturing when the opening-closing sensor detects the closed state of each the door and the drawer.

5. The food management system according to claim 1, wherein the first camera and the second camera capture a moving image.

6. A refrigerator in which a food item can be contained, the refrigerator comprising:
a first camera provided at an upper part of the refrigerator and configured to capture an image of an image capturing range including a door pocket of a door provided at a refrigerator compartment of the refrigerator and an opening of the refrigerator compartment of the refrigerator, when the door is in an opened state;
a second camera provided at the upper part of the refrigerator and configured to capture an image of an image capturing range including a drawer pulled out more frontward of the refrigerator than the door in the opened state, from a housing compartment other than the refrigerator compartment;
a processor configured to detect a food item taken into or out of the refrigerator based on an image capturing result of at least one of the first camera and the second camera;
an opening-closing sensor configured to detect the opened state or a closed state of at least one of the door and the drawer;
an illuminance sensor configured to detect illuminance at a place where the refrigerator is disposed; and a human detecting sensor configured to detect a person present around the refrigerator, the first camera and the second camera are located forward of the door in the closed state, the second camera is positioned more forward than the first camera in the upper part of the refrigerator, the processor determines whether or not the person is present around the refrigerator based on a detected result of the illuminance sensor and the human detecting sensor, and the first camera and the second camera start image capturing irrespective of detection of the closed state by the opening-closing sensor when it has been determined that the person is present around the refrigerator, and start image capturing when it has been determined that no person is present around the refrigerator and the opening-closing sensor detects the opened state of any of the door and the drawer.

\* \* \* \* \*